United States Patent [19]

Kitoh et al.

[11] Patent Number: 4,621,067
[45] Date of Patent: Nov. 4, 1986

[54] DIELECTRIC CERAMIC COMPOSITION

[75] Inventors: Ryozo Kitoh; Harumi Ikezawa, both of Ube, Japan

[73] Assignee: UBE Industries, Ltd., Yamaguchi, Japan

[21] Appl. No.: 686,273

[22] Filed: Dec. 26, 1984

[30] Foreign Application Priority Data

Dec. 26, 1983 [JP] Japan .................. 58-243749

[51] Int. Cl.$^4$ .......................... C04B 35/46
[52] U.S. Cl. .................. 501/136; 501/134; 501/135
[58] Field of Search .............. 501/135, 136, 134

[56] References Cited

U.S. PATENT DOCUMENTS 3,933,668  1/1976  Takahashi et al. ............ 501/136
4,073,846  2/1978  Masumura et al. ............ 501/135

FOREIGN PATENT DOCUMENTS 2361230  6/1975  Fed. Rep. of Germany ........ 50/136

0035236  11/1975  Japan ..................... 501/136

Primary Examiner—William R. Dixon, Jr.
Assistant Examiner—Karl Group
Attorney, Agent, or Firm—Finnegan, Henderson, Farabow, Garrett & Dunner

[57] ABSTRACT

A dielectric ceramic composition comprising oxides of strontium, zinc, niobium, and titanium, which is represented by the following composition formula;

$$Sr_1(Zn_{\frac{1}{3}}Nb_{\frac{2}{3}})_{1-x}Ti_xO_3$$

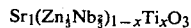

wherein Sr stands for strontium, Zn stands for zinc, Nb stands for niobium, Ti stands for titanium, O stands for oxygen, each suffix indicates the number of atoms, and x is a value larger than 0 but not larger than 0.5.

This dielectric ceramic composition can be used not only as a dielectric resonator or a material thereof but also as a material of a dielectric substrate for a microwave IC or a dielectric adjusting rod.

4 Claims, No Drawings

DIELECTRIC CERAMIC COMPOSITION

BACKGROUND OF THE INVENTION

(1) Field of the Invention

The present invention relates to a dielectric ceramic composition comprising oxides of strontium, zinc, niobium, and titanium, which is suitable as a dielectric resonator or resonator material. More particularly, the present invention relates to a dielectric ceramic composition which shows a large no-load value Q (Qu) and a specific inductive capacity ($\epsilon_r$) and has an excellent and stable temperature coefficient ($\tau_f$) of the resonance frequency when used for a dielectric resonator to be used in a microwave frequency band, especially a frequency band of 2 to 6 GHz.

(2) Description of the Related Art

When a cavity resonator is used for a microwave circuit, the size of the resonator becomes almost equal to the wavelength of the microwave. Accordingly, in order to diminish the size of the circuit, there has been adopted a method in which a dielectric ceramic is used for a resonator and the wavelength per se is shortened, thereby reducing the size of the circuit.

The size of the dielectric resonator is in inverse proportion to $\sqrt{\epsilon_r}$ and, as the dielectric constant is large, the circuit can be diminished. Accordingly, a ceramic composition having a larger specific inductive capacity is generally preferred as a resonator or resonator material. However, if the specific inductive capacity is extremely large, the resonator is overdiminished and handling becomes difficult. Therefore, the required value of the specific inductive capacity differs according to the frequency band in which the resonator is used.

One characteristic required for a dielectric resonator is a small dielectric loss. In other words, the no-load value Qu should be as large as possible and the temperature characteristic should be stable. However, in a dielectric resonator having a large specific inductive capacity, the no-load value Qu is usually small, and the no-load value Qu is further reduced as the frequency becomes high.

Various ceramic compositions such as those of $TiO_2$-$ZrO_2$-$SnO_2$, $CaTiO_3$-$MgTiO_3$-$LaO_3.2TiO_2$, and $Ba(Zn_\frac{1}{3}Nb_\frac{2}{3})O_3$ systems have been proposed as the ceramic composition for dielectric resonators. However, these ceramic compositions are defective in that when a dielectric resonator to be used in a frequency band of 2 to 6 GHz is fabricated, since the specific inductivity capacity is small, the size of the resonator is considerably large in a frequency band of 2 to 6 GHz, though the size of resonator may be reduced in a frequency band of, for example, about 11 GHz.

Japanese Examined Patent Publication (Kokoku) No. 50-34759 discloses a dielectric ceramic composition suitable as a ceramic battery material, which is represented by the following composition formula,

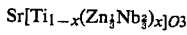

wherein x is a number of from 0.02 to 0.08.

According to the disclosures of this patent publication concerning the electrical characteristics of this ceramic composition, the tan δ value is small and about 0.03% (the no-load value Qu is about 3300) as measured at a low frequency such as 1 KHz. Accordingly, in a high frequency band of 2 to 6 GHz, the dielectric loss is too large and the ceramic composition is not practical for use as a dielectric resonator or resonator material. Furthermore, even if a dielectric resonator is fabricated by using this composition, the temperature coefficient of the resonance frequency becomes too large.

SUMMARY OF THE INVENTION

The present inventors carried out research with a view to developing a dielectric ceramic compositon suitable as a dielectric resonator or a material thereof to be used in a microwave frequency band, especially a frequency band of 2 to 6 GHz. As a result, it was found that a ceramic composition comprising strontium, zinc, niobium, and titanium at a specific ratio has an appropriately large specific inductive capacity, a large no-load value Qu, and stable temperature characteristics. The present invention was completed based on this finding.

More specifically, in accordance with the present invention, there is provided a dielectric ceramic composition comprising oxides of strontium, zinc, niobium, and titanium, which is represented by the following composition formula:

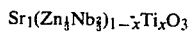

wherein Sr stands for strontium, Zn stands for zinc, Nb stands for niobium, Ti stands for titanium, O stands for oxygen, each suffix indicates the number of atoms, and x is a value larger than 0 but not larger than 0.5, preferably from 0.1 to 0.3.

As the value of x in the above composition formula is increased, that is, as the titanium content is increased, the specific inductive capacity tends to become larger, and if the value x is larger than 0.5, the no-load value Qu is too small and the value $\tau_f$ is extremely large, and hence, the composition is not suitable as a dielectric resonator material. Where the value x is 0, the no-load value Qu is large but the specific inductive capacity is small.

The dielectric ceramic composition of the present invention is especially preferred as a material of a dielectric resonator to be used in a microwave frequency band of 2 to 6 GHz. As is apparent from the examples given hereinafter, when a resonator is fabricated by using a composition in which the value x in the above-mentioned composition formula is, for example, 0.12 (Example 1), the specific inductive capacity is 44, and therefore, the size of the resonator can be reduced to an extent such that the diameter is about 15 mm and the thickness is about 3.2 mm. In this case, the no-load value Qu is as large as 5500 and the temperature coefficient ($\tau_f$) of the resonance frequency is 0 ppm/°C. and is very stable. Therefore, a small microwave circuit having a high performance can be fabricated.

Furthermore, since in the dielectric ceramic composition of the present invention the temperature coefficient of the resonance frequency can be changed over a broad range, in fabricating a dielectric resonator, an appropriate value of $\tau_f$ can be selected according to the ambient conditions, and the influence of the temperature characteristics of the resonator can be eliminated.

The dielectric ceramic composition of the present invention may be prepared by mixing starting materials such as chemically highly pure carbonates and/or oxides of strontium, zinc, niobium, and titanium, calcining and molding the mixture, and then firing the molded mixture to effect sintering. However, an especially excellent dielectric ceramic composition can be obtained according to the following method in which calcination is carried out two times.

Predetermined amounts of chemically highly pure strontium carbonate, zinc oxide, niobium pentoxide, and titanium dioxide are wet-mixed together with a solvent such as water or an alcohol. The water or the alcohol is then removed, and the residual mixture is pulverized and then calcined at 800° C. to 1300° C. for about 10 hours in an oxygen gas-containing atmosphere, for example, in air. The calcination product is pulverized, and calcination and pulverization are carried out again according to need. An organic binder such as polyvinyl alcohol is added to the pulverization product to form a homogeneous mixture, the mixture is dried, pulverized, and compression-molded (under a pressure of 100 to 1000 Kg/cm$^2$), and the molded body is fired at 1400° C. to 1650° C. in an oxygen-containing gas atmosphere, for example, in air, and thus the intended dielectric ceramic composition can be obtained. This dielectric ceramic composition can be used as a dielectric resonator as it is or after processing into an appropriate shape and size. For example, the dielectric resonator is in a disc form having a diameter of 5 to 20 mm and a thickness of 2 to 10 mm. This dielectric ceramic compositon can be used not only as a dielectric resonator or a material thereof but also as a material of a dielectric substrate for a microwave IC or a dielectric adjusting rod.

The invention will be further illustrated below in detail by the following non-limitative examples.

EXAMPLE 1

A ball mill was charged with 0.77 mole of a powder of strontium carbonate (SrCO$_3$), 0.23 mole of a powder of zinc oxide (ZnO), 0.23 mole of a powder of niobium pentoxide (Nb$_2$O$_5$), and 0.09 mole of a powder of titanium dioxide (TiO$_2$), together with nylon balls and ethanol, and wet mixing was carried out for 10 hours. The mixture was taken out from the ball mill, the ethanol used as the solvent was evaporated, and the residual mixture was pulverized for 1 hour by means of a pulverizer.

The pulverized product was calcined at 1000° C. for 10 hours in an air atmosphere, was pulverized again for 1 hour by means of a pulverizer, and the pulverized product was then calcined at 1200° C. for 10 hours. Then, the calcination product was pulverized for 1 hour by means of a pulverizer.

The obtained calcined powder was mixed with 37% by weight of a polyvinyl alcohol solution having a concentration of 2% by weight, and a homogeneous mixture was formed. Then, the homogeneous mixture was dehydrated and dried, pulverized for 1 hour by a pulverizer, and molded into a disc having a diameter of 20 mm and a thickness of 6 mm under a molding pressure of 100 kg/cm$^2$.

The molded body was placed in a crucible composed of an alumina having a high purity, and the molded body was fired at 1600° C. for 2 hours in an air atmosphere to effect sintering and obtain a dielectric ceramic composition. The molded body having the so-obtained dielectric ceramic composition was further cut to a diameter of 15 mm and a thickness of about 3 mm, and the no-load value (Qu) and specific inductive capacity ($\epsilon_r$) at the resonance frequency (f$_0$) were determined according to the dielectric resonator method. Measurement of the temperature dependency of the resonance frequency was carried out at temperatures within a range of from −30° C. to 60° C., and the temperature coefficient ($\tau_f$) was determined. The results obtained are shown in Table 1.

EXAMPLES 2 THROUGH 7

Dielectric ceramic compositions were prepared in the same manner as described in Example 1 except that the amounts used of the starting materials were changed to obtain the compositions shown in Table 1, and the firing temperature was changed in some Examples. The electrical characteristics were determined and the results obtained are shown in Table 1.

COMPARATIVE EXAMPLES 1 THROUGH 4

Dielectric ceramic compositions were prepared in the same manner as described in Example 1 except that the amounts used of the starting materials were changed to obtain the compositions shown in Table 1, and the firing temperature was changed in some Examples. The electrical characteristics were determined and the results obtained are shown in Table 1.

TABLE 1

| | Sr$_1$(Zn$_{\frac{1}{3}}$Nb$_{\frac{2}{3}}$)$_{1-x}$ 1-x | Ti$_x$O$_3$ x | Firing Temperature (°C.) | Q$_u$ | $\epsilon_r$ | $\tau_f$ (ppm/°C.) |
|---|---|---|---|---|---|---|
| Examples | | | | | | |
| 1 | 0.88 | 0.12 | 16.00 | 5500 | 44 | 0 |
| 2 | 0.90 | 0.10 | 1610 | 5800 | 43 | −5.0 |
| 3 | 0.89 | 0.11 | 1600 | 5700 | 44 | −2.1 |
| 4 | 0.87 | 0.13 | 1600 | 5300 | 44 | 1.0 |
| 5 | 0.85 | 0.15 | 1600 | 5100 | 45 | 9.2 |
| 6 | 0.70 | 0.30 | 1580 | 3200 | 54 | 73 |
| 7 | 0.50 | 0.50 | 1550 | 2100 | 75 | 285 |
| Comparative Examples | | | | | | |
| 1 | 1 | 0 | 1510 | 6800 | 35 | −40 |
| 2 | 0.30 | 0.70 | 1550 | 1500 | 121 | 720 |
| 3 | 0.10 | 0.90 | 1550 | 1200 | 196 | 1310 |
| 4 | 0 | 1 | 1520 | 300 | 255 | 1670 | f$_0$: 2 to 4 GHz

We claim:
1. A dielectric ceramic composition consisting essentially of oxides of strontium, zinc, niobium, and titanium, which is represented by the following composition formula,

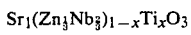

$$Sr_1(Zn_{\frac{1}{3}}Nb_{\frac{2}{3}})_{1-x}Ti_xO_3$$

wherein Sr stands for strontium, Zn stands for zinc, Nb stands for niobium, Ti stands for titanium, O stands for oxygen, each suffix indicates the number of atoms, and x is a value larger than 0 but not larger than 0.5.

2. A dielectric ceramic composition as set forth in claim 1, wherein x is a number of from 0.1 to 0.3.

3. A dielectric ceramic composition as set forth in claim 1, suitable for use in the fabrication of a dielectric resonator for a microwave frequency band.

4. A dielectric ceramic composition as set forth in claim 3, wherein the microwave frequency band is 2 to 6 GHz.

* * * * *